(12) United States Patent
Shirai

(10) Patent No.: US 6,344,639 B1
(45) Date of Patent: *Feb. 5, 2002

(54) BEAM SPLITTER FOR AUTOMATIC FOCUSING DEVICE

(75) Inventor: Masami Shirai, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/305,755

(22) Filed: May 6, 1999

(30) Foreign Application Priority Data

May 8, 1998 (JP) ........................................... 10-126231

(51) Int. Cl.$^7$ ................................................ G02B 7/04
(52) U.S. Cl. ..................................... 250/201.3; 359/383
(58) Field of Search ........................... 250/201.3, 201.2, 250/204, 205, 216, 201.5; 359/383, 583, 636, 629, 249–251, 639, 620–625; 369/49.14

(56) References Cited

U.S. PATENT DOCUMENTS

| 4,650,335 A | | 3/1987 | Ito et al. ....................... 356/398 |
| 4,670,645 A | * | 6/1987 | Ohtaka et al. ............. 250/201.8 |
| 4,862,442 A | * | 8/1989 | Tadokoro et al. .......... 369/44.14 |
| 5,400,179 A | | 3/1995 | Ito ................................ 359/588 |
| 5,424,876 A | | 6/1995 | Fujii ............................ 359/884 |
| 5,715,101 A | | 2/1998 | Nakamura et al. ........... 359/823 |
| 5,796,517 A | | 8/1998 | Sensui et al. ................. 359/426 |
| 5,844,231 A | | 12/1998 | Suzuki et al. .............. 250/201.2 |
| 5,856,663 A | | 1/1999 | Suzuki et al. .............. 250/201.2 |
| 5,856,664 A | | 1/1999 | Suzuki et al. .............. 250/201.2 |
| 5,872,661 A | | 2/1999 | Suzuki et al. ................ 359/698 |
| 5,886,340 A | | 3/1999 | Suzuki et al. .............. 250/201.7 |

FOREIGN PATENT DOCUMENTS

JP 10-73772 3/1998

* cited by examiner

Primary Examiner—Que T. Le
Assistant Examiner—Thanh X. Luu
(74) Attorney, Agent, or Firm—Greenblum & Bernstein P.L.C.

(57) ABSTRACT

A beam splitting optical system for an automatic focusing apparatus includes a telescopic system having an objective optical system and a viewing optical system, a beam splitter which splits object-carrying light transmitted through the objective optical system of the telescopic optical system by a splitter surface, and a focus detection optical system having a pair of light receivers which receive beams of the object-carrying light split by the splitter surface. The focus detection optical system is arranged so that beams of the object-carrying light to be respectively received by the light receivers are incident upon the splitter surface of the beam splitter at different incident angles. An optical element is provided in a light path of at least the larger quantity of beams of the object-carrying light, among those to be received by the pair of light receivers so as to reduce the quantity of light to be transmitted therethrough.

18 Claims, 8 Drawing Sheets

BEAM SPLITTER FOR AUTOMATIC FOCUSING DEVICE

BACKGROUND OF THE INVENTION

1. Field of the Invention

The present invention relates to a beam splitting optical system for an auto-focus sensor, which can be utilized in an optical instrument, and in particular with a surveying instrument.

2. Description of the Related Art

In a conventional automatic focusing device for a surveying instrument having a collimator telescope (such as a total station), a light path of a focus detection optical system is split from a light path of a collimating optical system by a beam splitting optical system to detect the focus state on a surface (referred to as a reference focusing surface) which is optically equivalent to the focusing surface of the collimating optical system by means of a phase difference detection type auto-focus sensor module having a pair of CCD sensors, in order to calculate the amount of defocus of a focusing lens. Consequently, the focusing lens is moved to an in-focus position in accordance with the defocus amount to complete an automatic focusing (AF) operation. The principle of the AF function in which the phase difference is detected is known in the art, and is used in an AF single lens reflex camera.

In a conventional beam splitter system for an auto-focus sensor, the beam splitter and the auto-focus sensor are arranged so that the beams of light received by the pair of CCD sensors are made incident upon a coated splitter surface of the beam splitting optical system at different incident angles. In this arrangement, since the transmittance of the splitter surface which is made of a multi-layered dielectric film varies depending on the incident angle, there is a difference in the level between the quantities of light received by the pair of CCD sensors. To prevent a level difference occurring, it is necessary to arrange the optical elements so that the incident angles of the beams incident upon the split surface are identical. This reduces the freedom of design of the layout of the optical elements, hindering any possible enhancement in operational efficiency, hindering miniaturization and reduces the weight of the optical system.

The difference in the quantity of light caused due to the above-mentioned arrangement is usually corrected using a correction coefficient in the determination of the focus during the automatic focusing operation. However, if the difference is large or if electric noise is produced in the auto-focus sensor itself, the noise is increased according to the correction coefficient, thus resulting in a failure to perform a precise auto-focusing operation. This tends to occur when the quantity of light is small, for example, at dusk.

SUMMARY OF THE INVENTION

It is an object of the present invention to eliminate the above-mentioned drawbacks of the prior art, by reducing the difference in the quantity of light received by a pair of CCD sensors within the auto-focus sensor to thereby reduce the restriction of the arrangement of the components in the beam splitting optical system.

In order to achieve the above-mentioned aim, there is provided a beam splitting optical system for an automatic focusing apparatus including: a telescopic system having an objective optical system and a viewing optical system; a beam splitter provided between the objective optical system and the viewing optical system, the beam splitter being provided with a splitter surface to split object-carrying light transmitted through the objective optical system; a focus detection optical system having a pair of light receiving elements which respectively receive an object-carrying light beam split by and transmitted through the splitter surface of the beam splitter, the focus detection optical system being arranged so that the object-carrying light beam to be respectively received by the respective light receiving elements is incident upon the splitter surface at different incident angles; and an optical element that is provided between the splitter surface and the pair of light receiving elements, wherein one of the object-carrying light beams having a larger quantity is reduced in the quantity of light to be transmitted through the optical element, to thereby reduce the difference in quantity of light between each object-carrying light beam respectively received by the pair of light receiving elements.

According to another aspect of the present invention, there is provided a beam splitting optical system for an automatic focusing apparatus including: a telescopic system having an objective optical system and a viewing optical system through which an object image formed on a predetermined focusing surface by the objective optical system can be viewed; a beam splitter which splits object-carrying light transmitted through the objective optical system of the telescopic optical system via a splitter surface thereof; an auto-focus sensor module which detects a focus state on a reference focusing surface which is optically equivalent to the predetermined focusing surface on the light path of the object-carrying light split by the beam splitter; the auto-focus sensor module being provided with a pair of optical sensors, the auto-focus sensor module and the beam splitter being arranged so that an object-carrying light beam to be respectively received by the pair of optical sensors is incident upon the splitter surface of the beam splitter at different incident angles; an optical element provided between the beam splitter and the auto-focus sensor module in a light path of at least the larger quantity of beams of the object-carrying light, to be received by the optical sensors so as to reduce the quantity of light to be transmitted therethrough.

Preferably, the optical element includes an optical element having a higher transmittance disposed in the light path of a smaller quantity of light, and an optical element having a low transmittance disposed in the light path of the larger quantity of light.

Preferably, the splitter surface is made of a multi-layered dielectric film.

It is possible for the optical element, that reduces the quantity of light transmitted therethrough, to have a transmittance distribution which changes continuously or stepwise from a low transmittance to a high transmittance.

Preferably, the optical element to reduce the quantity of light transmitted therethrough has a uniform transmittance distribution.

Preferably, the optical element to reduce the quantity of light transmitted therethrough includes an ND filter.

Preferably, the splitter surface is defined by a reflection surface of an optical element which constitutes an image erecting optical system provided in the telescopic optical system.

Preferably, the optical element which constitutes an image erecting optical system is a Porro prism.

The present disclosure relates to subject matter contained in Japanese Patent Application No.10-126231 (filed on May 8, 1998) which is expressly incorporated herein by reference in its entirety.

BRIEF DESCRIPTION OF THE DRAWINGS

The invention will be described below in detail with reference to the accompanying drawings in which:

FIG. 6A is a top view of a main portion of a second embodiment of the present invention.

DESCRIPTION OF THE PREFERRED EMBODIMENTS

Embodiments of the present invention will be discussed below.

Figure 1:
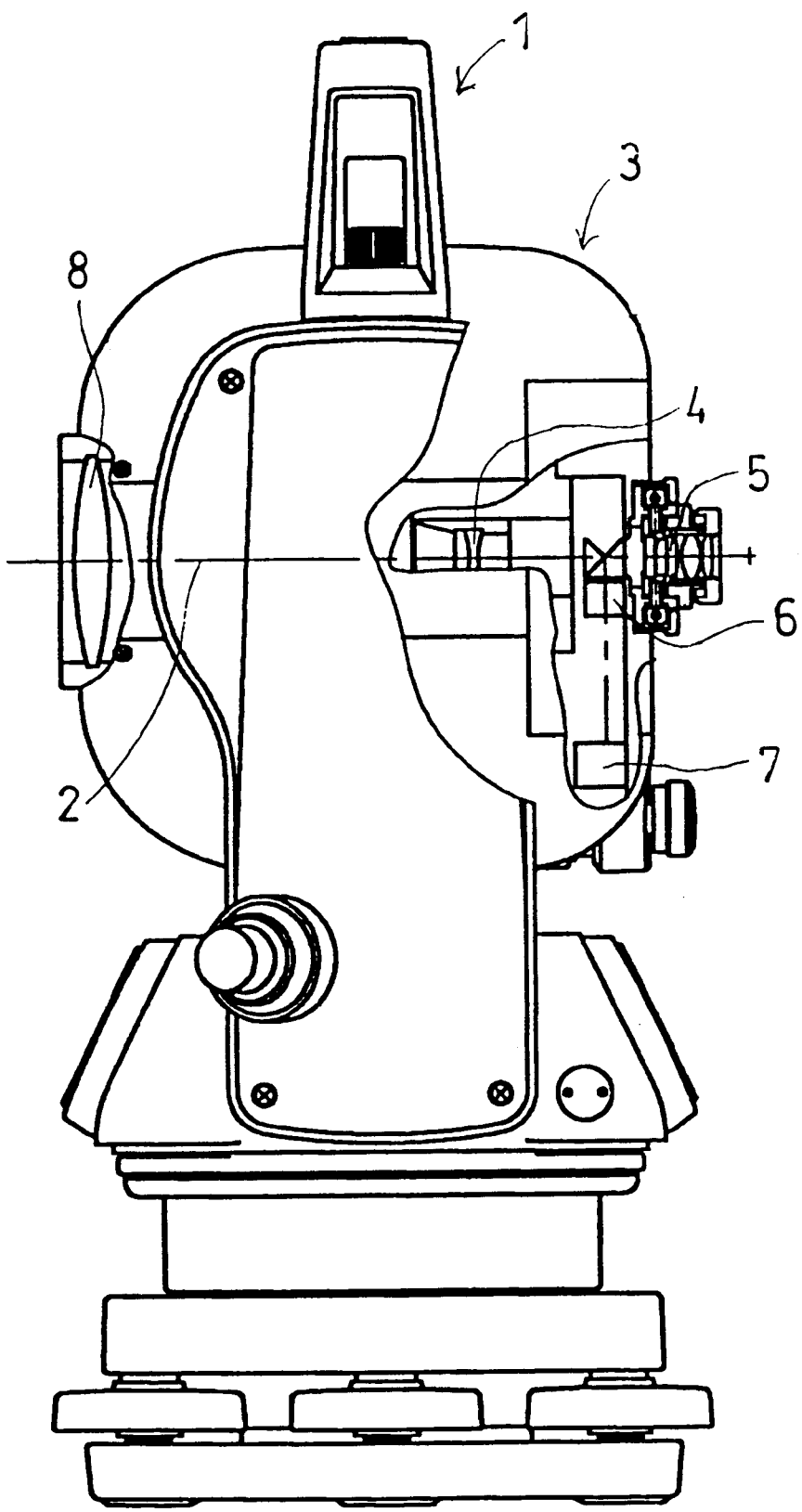
FIG. 1 is a partially sectioned side view of a surveying instrument total station according to an embodiment of the present invention.
Figure 2:
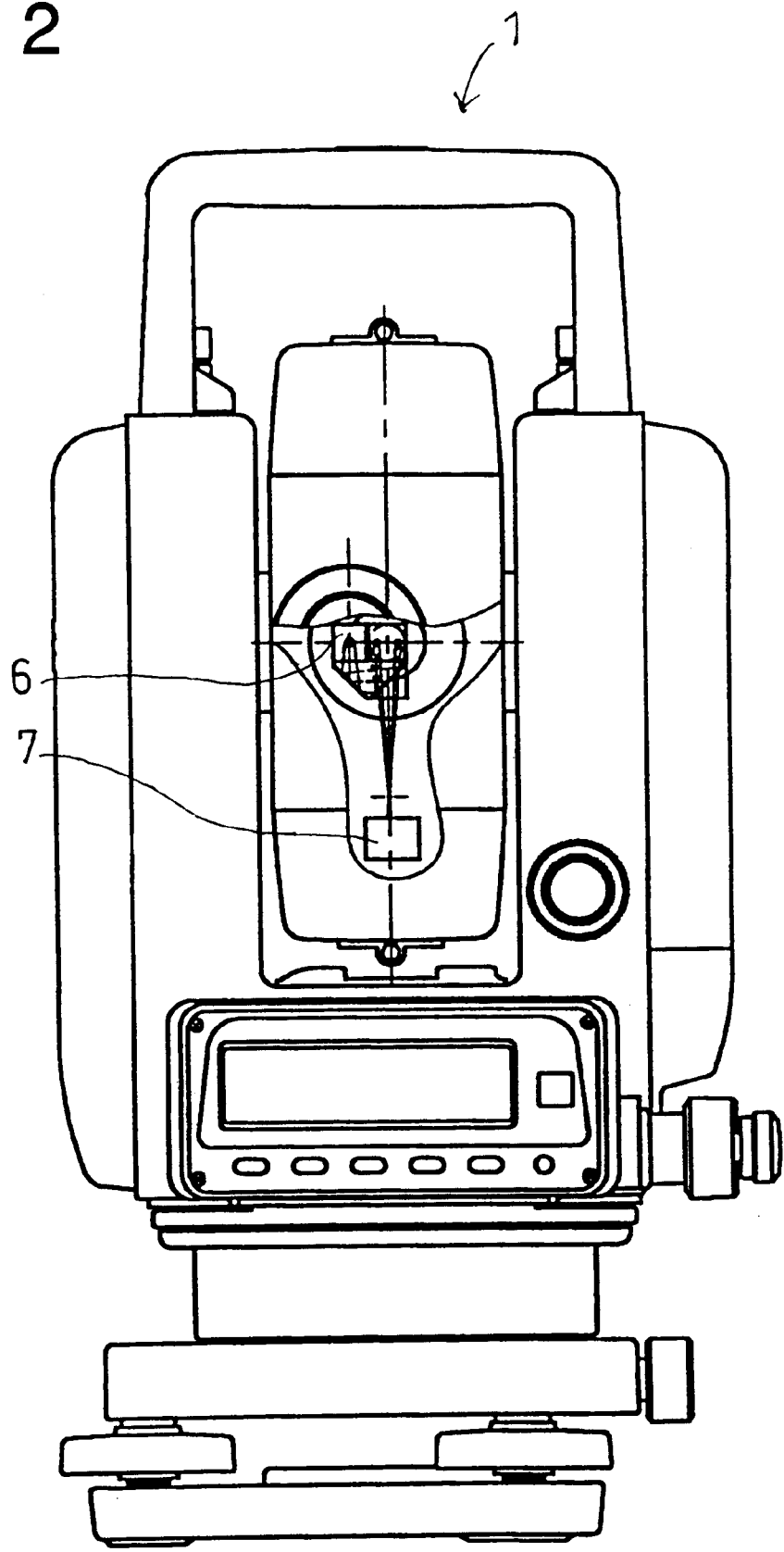
FIG. 2 is a front elevational view of a total station shown in FIG. 1.

FIGS. 1 and 2 are side and front views of a surveying instrument total station, respectively. A telescope 3 of the total station 1 forms an erect image of an object on a focusing plate 5 via an objective optical system which includes an objective lens 8, a focusing lens 4, and a Porro prism 6. An operator can view the object image formed on the focusing plate 5 through an eyepiece (ocular lens) which constitutes a viewing optical system.

Figure 4:
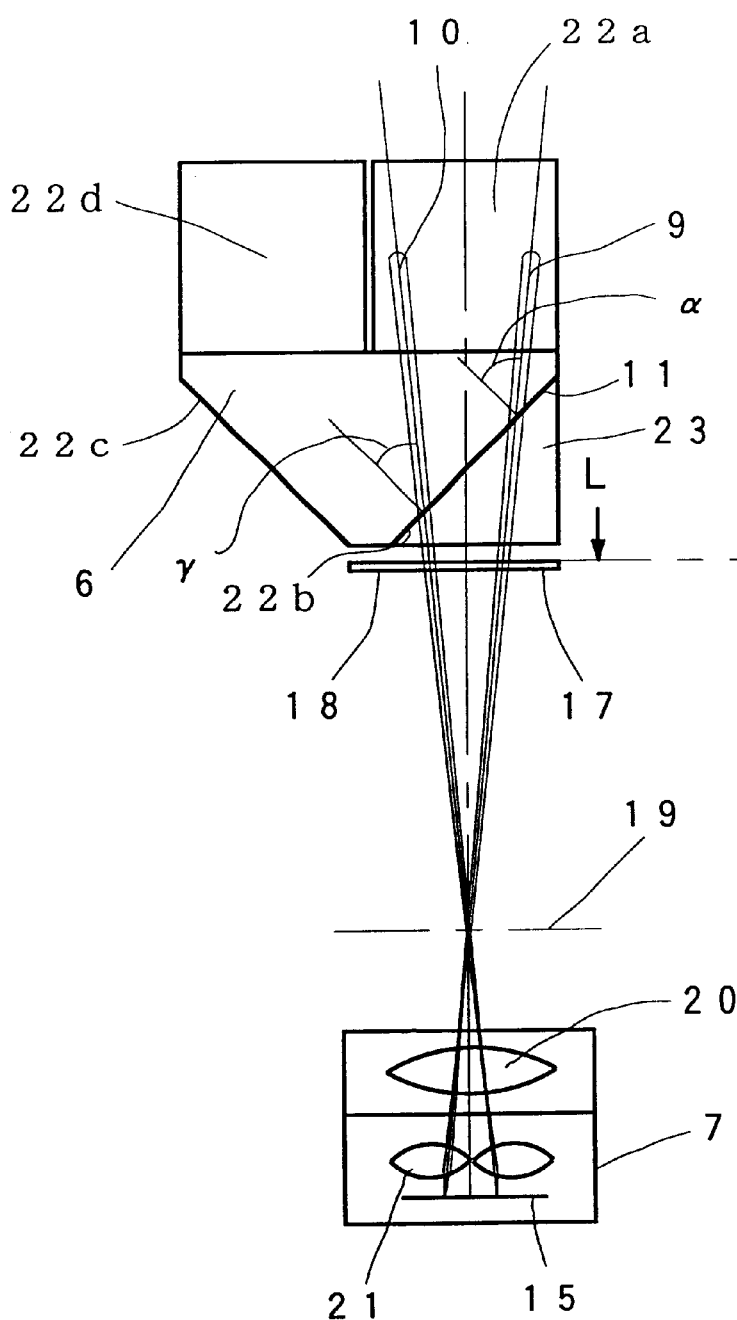
FIG. 4A is an enlarged front view of a main portion of a total station according to a first embodiment of the present invention.
FIG. 4B is an end view of an ND filter, viewed from an arrow L in FIG. 4A.
Figure 4:
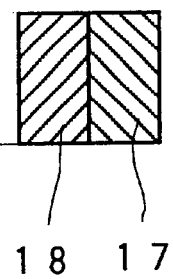

FIGS. 4A and 4B show the positional relationship between the Porro prism 6 and an auto-focus sensor module 7. The auto-focus sensor module 7 is provided on the light path of the focus detection optical system which is split from the light path of the objective optical system by a coated splitter surface 11 of the Porro prism 6 to detect the focus state (amount of defocus) on a reference focusing surface 19 which is optically equivalent to the focusing plate 5. Object-carrying light transmitted through the objective lens 8 is split into light which is made incident upon the focusing plate 5 and focus detection light which is made incident upon the auto-focus sensor module 7. The auto-focus sensor module 7 receives the object-carrying light via a pair of CCD sensors and sends electric signals to a focus state calculation (defocus calculation) device. The auto-focus sensor module 7 is well known in the art.

Figure 3:
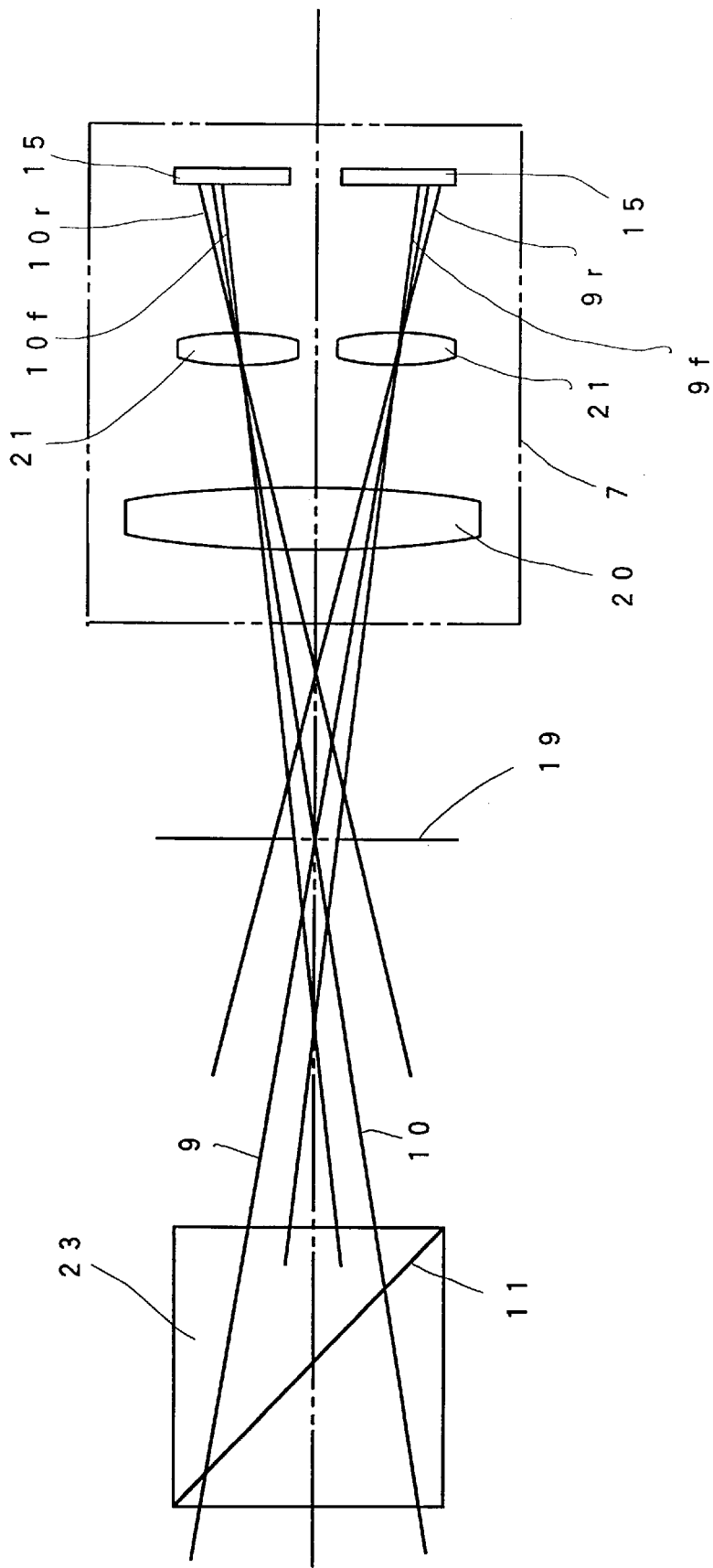
FIG. 3 is a conceptual view of the principle of an auto-focus system.

FIG. 3 shows the main concept of the focus detection of the auto-focus sensor module 7 by way of example. In FIG. 3, a condenser lens 20 and a pair of separator lenses 21 are provided in this order optically behind the reference focusing surface 19. A pair of CCD sensors 15 are provided behind the corresponding separator lenses 21. The light transmitted through the condenser lens 20 is split by the separator lenses 21 and the split beams are received by the respective CCD sensors 15 to form object images. Principal rays of the beams which form the object images on the sensors 15 are indicated by the numerals 9 and 10.

The image formation position of the CCD sensors 15 at which the object images are formed varies depending on the position of the image on the reference focusing surface 19, i.e., when the image of a target is formed correctly on the reference focusing surface 19 represented by the principal rays 9 and 10; when the image is formed in front of the reference focusing surface 19 represented by the rays 9f and 10f (front focus); or when the image is formed behind the reference focusing surface 19 represented by the rays 9r and 10r (rear focus), as shown in FIG. 3. The deviation from the focus position is detected based on the distance between the object images formed on the CCD sensors 15. The focus state calculation device to which the output of the CCD sensors 15 are input, amplifies the output by a preamplifier and performs the calculation by a calculation circuit to detect an "in-focus", "out-of-focus", "front focus" or "rear focus". Consequently, the amount of defocus on the reference focusing surface 19 and the displacement of the focusing lens 4 necessary to move the same to the focal position are determined.

Figure 5:
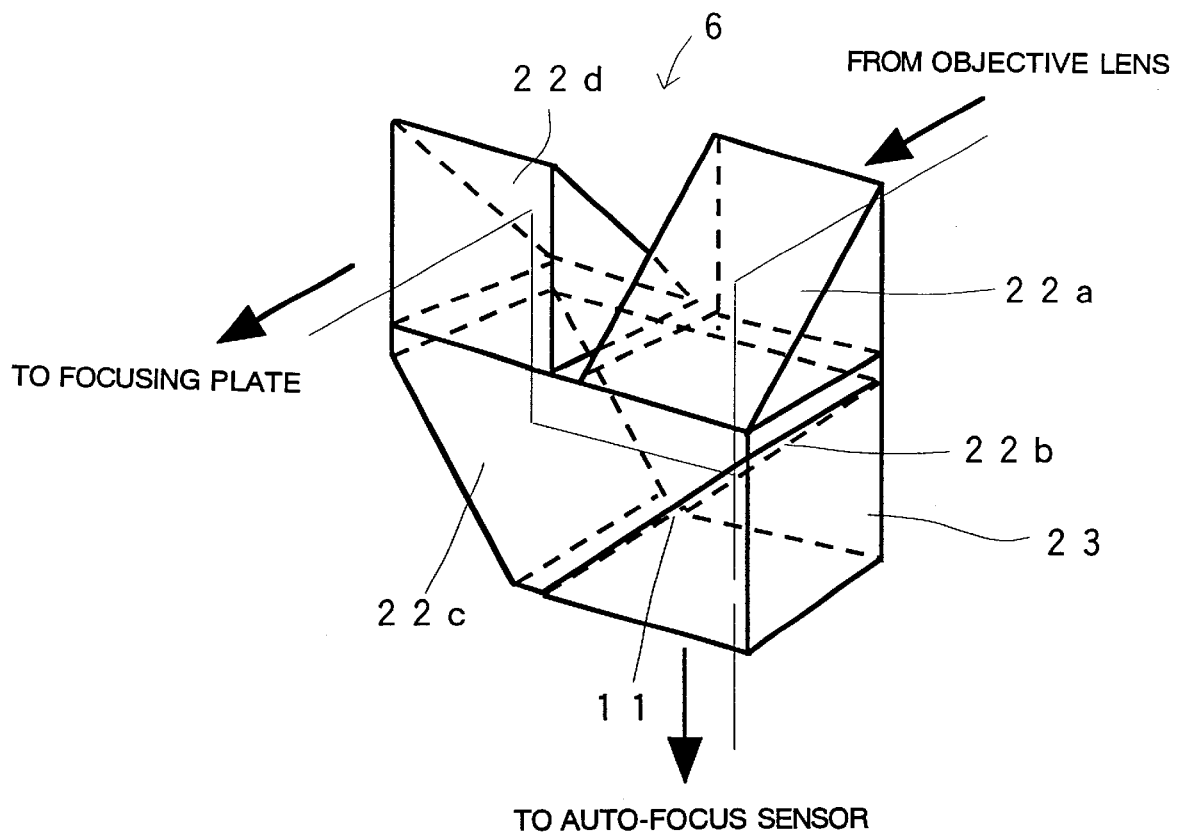
FIG. 5 is a perspective view of a Porro prism shown in FIG. 4A.

In the first embodiment, as shown in FIG. 4A, which is an enlarged front view of the Porro prism 6, the auto-focus sensor module 7 is located below the Porro prism 6, and a prism 23 is attached to a second reflection surface 22b of the Porro prism 6, so that the boundary surface therebetween defines the coated splitter surface 11 of a beam splitter (FIG. 5). In this embodiment, light incident upon the Porro prism 6 is split by the splitter surface 11 into reflected light and transmitted light. Thereafter, the reflected light forms an erect image on the focusing plate 5, and the transmitted light reaches the auto-focus sensor module 7 and forms object images on the pair of CCD sensors 15. The CCD sensors 15 are disposed in a plane normal to the optical axis of the condenser lens 20 connecting the centers of the splitter surface 11 and the auto-focus sensor module 7 and are juxtaposed in the lateral direction; i.e., in the lateral direction with respect to the field of view (see FIG. 4A). This arrangement is particularly advantageous when an object for which the surveying instrument is to be collimated is a vertically elongated member such as a pole. The CCD sensors 15 receive the beams 9 and 10 transmitted through the splitter surface 11. As shown in FIG. 4A, the beams of light 9 and 10 are incident upon the splitter surface 11 at different incident angles α and γ.

In general, the coated splitter surface 11 is made of a multi-layered dielectric film having less absorption of light, the transmittance and reflectance thereof being determined (designed) based on the reference incident angle (45°) of light incident upon the center portion thereof. However, the transmittance of the dielectric film varies depending on the incident angle. Therefore, if there is no difference in the quantity of light between the beams 9 and 10 before the splitter surface 11, after the beams 9 and 10 are transmitted through the splitter surface 11, a difference in the quantity of light between the beams 9 and 10 occurs. To prevent this problem, in the illustrated embodiment, two ND filters 17 and 18 having different transmittances are inserted in the light paths of the beams 9 and 10. The light having a higher quantity level passes through the ND filter having a lower transmittance and the light having a lower quantity level passes through the ND filter having a higher transmittance (FIG. 4A). Consequently, the difference in the quantity of light between the beams 9 and 10 incident upon the CCD sensors 15 is reduced, so that the output difference of the auto-focus sensor module can be minimized to thereby eliminate the above-mentioned problem.

In other words, the difference in the quantity of light between the beams 9 and 10 transmitted through the splitter surface 11 is reduced when the beams pass through the ND filters 17 and 18, and thereafter the beams 9 and 10 are received by the auto-focus sensor module 7. Thus, a precise focusing operation can be achieved.

Although the two ND filters are provided in the first embodiment, it is possible to provide a single ND filter which is provided with two transparent portions having different transmittances.

Figure 8:
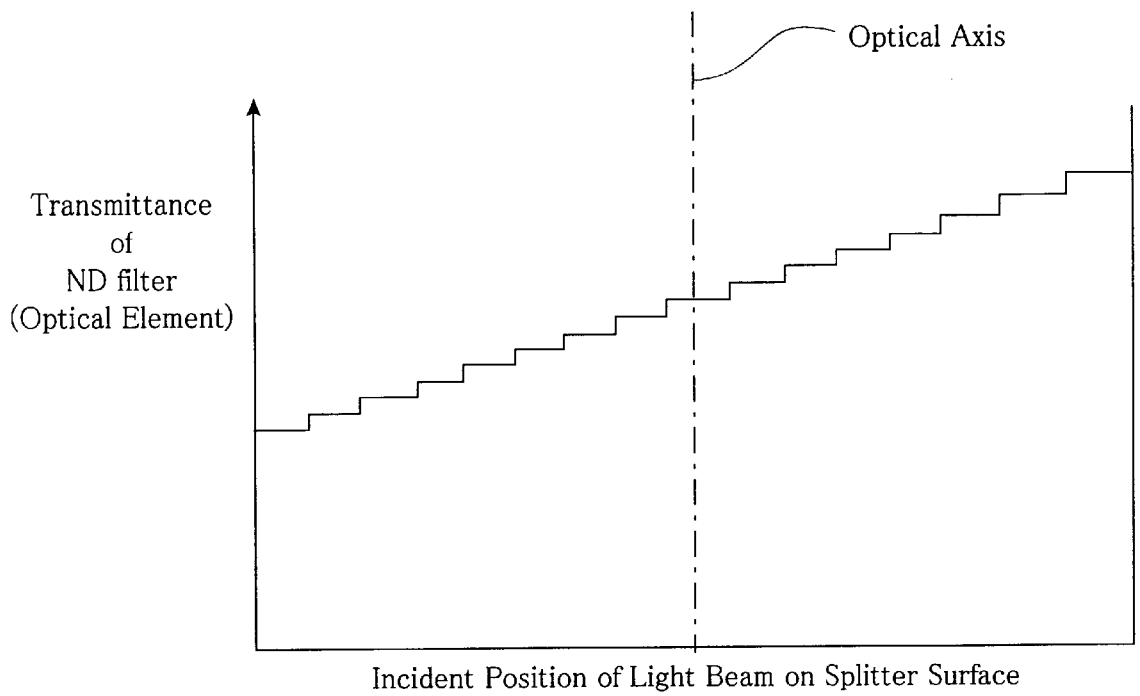
FIG. 8 is a diagram illustrating a stepped transmittance distribution of an optical element utilized in the present invention.
Figure 9:
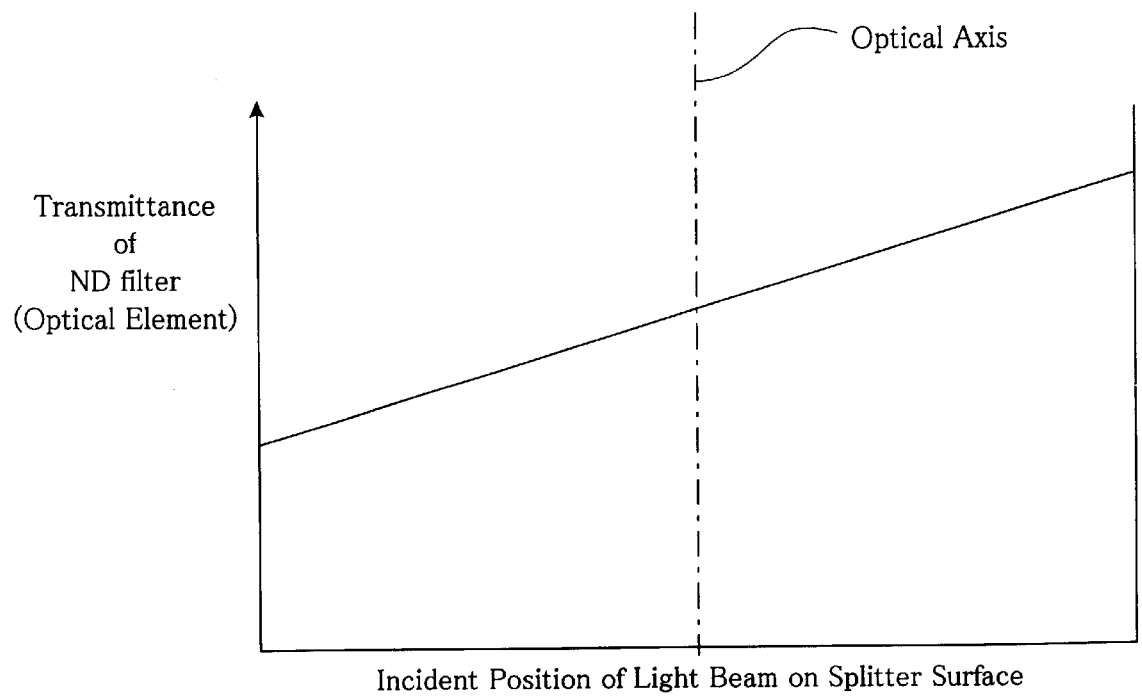
FIG. 9 is a diagram illustrating a continuous transmittance distribution of an optical element utilized in the present invention.

Each ND filter 17 and 18 has a uniform transmittance distribution. In practice, it is sufficient for the transmittance distribution to be uniform. However, to enhance the precision, the ND filters can be provided with a non-uniform transmittance distribution which changes stepwise as shown in FIG. 8, or continuously as shown in FIG. 9; in accordance with the incident position and incident angle. Moreover, it is also possible to provide an ND filter only for the light having a larger quantity.

Although the second reflection surface 22b of the Porro prism 6 defines the splitter surface in the first embodiment, it is possible to define the splitter surface by the first reflection surface 22a, the third reflection surface 22c, or the fourth reflection surface 22d thereof.

Figure 6:
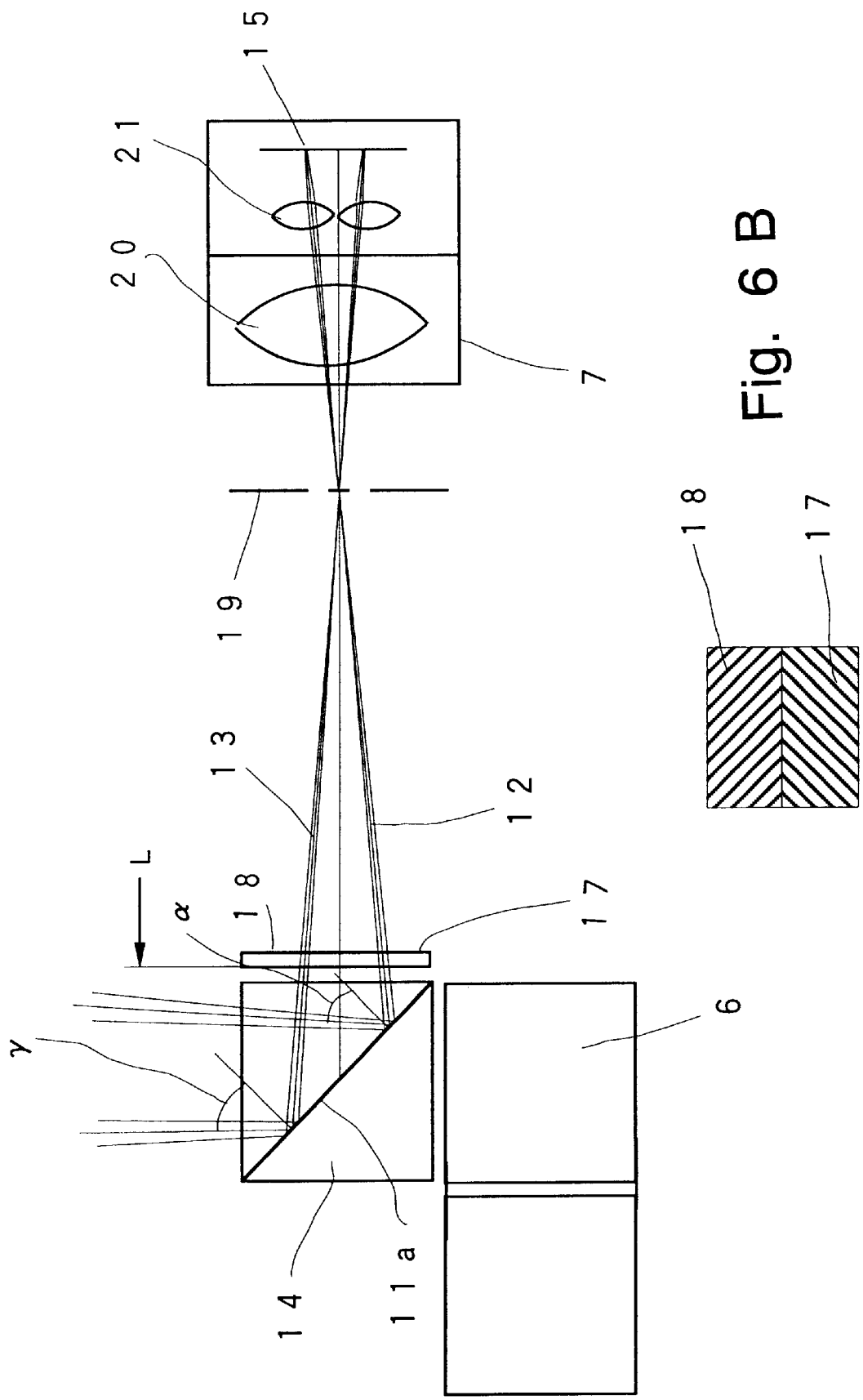
FIG. 6 is an end view of an ND filter, viewed from an arrow L in FIG. 6A.
Figure 7:
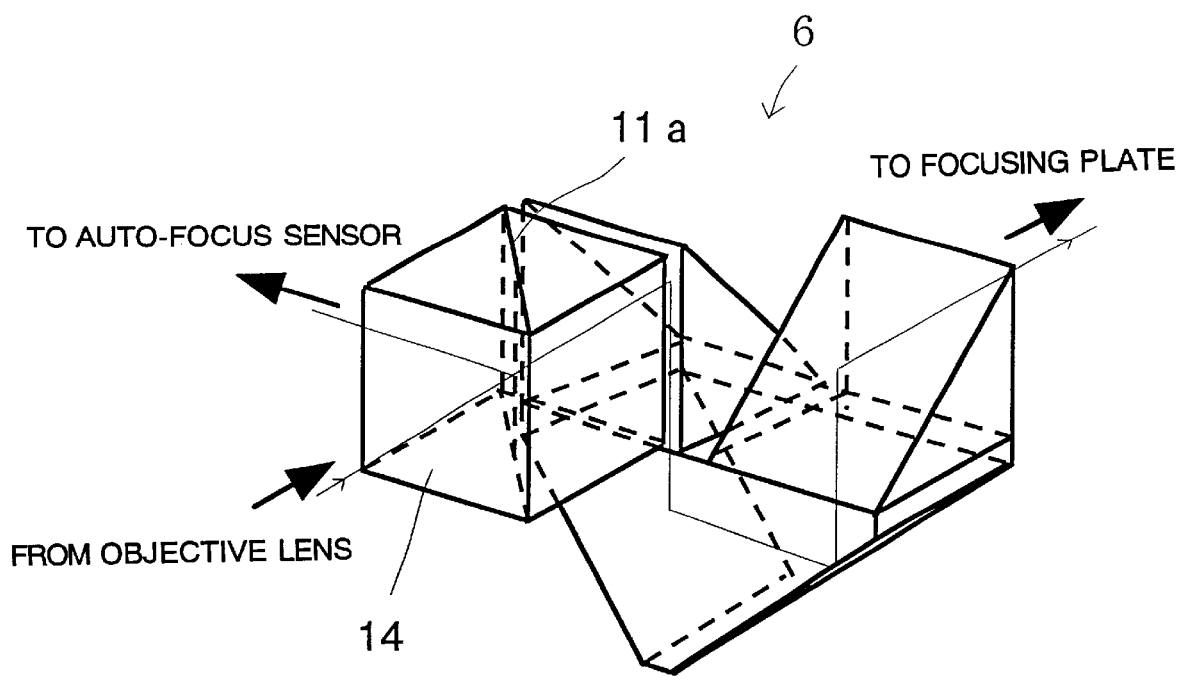
FIG. 7 is a perspective view of a Porro prism shown in FIG. 6A.

FIGS. 6A, 6B and 7 show the second embodiment of the present invention. The beam splitter 14 is provided on the front side of the Porro prism 6, i.e., on the objective lens side as clearly shown in FIG. 7, so that the light is split by the reflection at the coated splitter surface 11a in the right direction in FIG. 6. A pair of CCD sensors 15 are disposed in a plane normal to the optical axis of the condenser lens 20 connecting the centers of the splitter surface 11a and the auto-focus sensor module 7 and are juxtaposed in the lateral direction; i.e., in the lateral direction with respect to the field of view (see FIG. 6A). In this embodiment, the beams 12 and 13 are incident upon the coated splitter surface 11a at different incident angles α and γ, so that the reflectance of the splitter surface at the different incident points are different, due to the angle-dependency of the multi-layered dielectric film. Consequently, there is a difference in the quantity of light between the beams 12 and 13 received by the CCD sensors 15.

To prevent this problem, two ND filters 17 and 18 having different transmittances are inserted in the light paths of the beams 12 and 13 in such a way that the larger quantity of light passes through the ND filter having a lower transmittance and the smaller quantity of light passes through the ND filter having a higher transmittance. Consequently, the difference in the quantity of light transmitted through the ND filters is made small to thereby eliminate the above-mentioned problem.

In other words, in the second embodiment, the light entering the optical system through the objective lens 8 is transmitted through the focusing lens 4, and is split by the beam splitter 14 located in front of the Porro prism 6 into transmitted light and reflected light. The transmitted light is incident upon the Porro prism 6 to form an erect image on the focusing plate 5. The reflected light passes through the ND filters 17 and 18 by which the difference in the quantity of light between the beams 12 and 13 is reduced and reaches the auto-focus sensor module 7 to carry out a precise focusing operation.

As in the first embodiment, each of the ND filters 17 and 18 are provided to have a uniform transmittance distribution depending on the incident angle of each beam.

In practice, it is sufficient for the transmittance distribution to be uniform. However, to enhance the precision, the ND filters can be provided with a non-uniform transmittance distribution which changes stepwise or continuously, in accordance with the incident position and incident angle. Moreover, it is also possible to provide an ND filter only for the light having a larger quantity.

Although in the first and second embodiments, the auto-focus sensor module 7 and the splitter surface 11 or 11a a are located at specific positions, the arrangement is not limited thereto. The invention can be generally applied to an arrangement in which the beams of light to be received by a pair of CCD sensors are incident upon the splitter surface 11 or 11a at different incident angles.

Although only one focus detection optical system is provided in the first or second embodiment, the present invention can be applied to a multi-point AF system having a plurality of focus detection optical systems.

As can be understood from the above discussion, since optical elements such as ND filters having different transmittances, are inserted in the light paths of beams to be received by a pair of light receiving elements provided within the focus detection optical system, there is little or no difference in the quantity of light to be received even in a conventional layout of the optical components in which the difference in the quantity of light could be otherwise produced. Consequently, the freedom of layout of the components can be enhanced, thus resulting in miniaturization, reduction of weight, and improvement of operability.

Moreover, in comparison with the correction of the difference in the quantity of light, using a correction coefficient, the optical system is less influenced by electrical noise. Thus, a precise automatic focusing operation can be achieved.

What is claimed is:

1. A beam splitting optical system for an automatic focusing apparatus comprising:
   an optical system having an objective optical system and a viewing optical system;
   a beam splitter provided between the objective optical system and the viewing optical system, said beam splitter being provided with a splitter surface to split object-carrying light transmitted through the objective optical system, said splitter surface comprising a multi-layered dielectric film;
   a focus detection optical system having a pair of light receiving elements which respectively receive an object-carrying light beam split by and transmitted through the splitter surface of the beam splitter, said focus detection optical system being arranged so that said object-carrying light beam to be respectively received by each of said pair of light receiving elements is incident upon the splitter surface at different angles; and
   an optical element that is provided between said splitter surface and said pair of light receiving elements, wherein one of said object-carrying light beams received by a light receiving element having a larger quantity of light is reduced, by said optical element, in the quantity of light to be transmitted, to thereby reduce the difference in quantity of light between each said object-carrying light beam received by each of said pair of light receiving elements.

2. A beam splitting optical system for an automatic focusing apparatus according to claim 1, wherein said optical element comprises an optical element having a higher transmittance disposed in the light path of a smaller quantity of light, and an optical element having a low transmittance disposed in the light path of the larger quantity of light.

3. A beam splitting optical system for an automatic focusing apparatus according to claim 1, wherein the optical element to reduce the quantity of light transmitted therethrough has a transmittance distribution which changes continuously or stepwise from a low transmittance to a high transmittance.

4. A beam splitting optical system for an automatic focusing apparatus according to claim 1, wherein said optical element that reduces the quantity of light transmitted therethrough is divided into two areas, one of said two areas corresponding to a respective one of said pair of line sensors, each of said two areas having a uniform transmittance distribution.

5. A beam splitting optical system for an automatic focusing apparatus according to claim 1, wherein said optical element that reduces the quantity of light transmitted therethrough comprises a neutral density filter.

6. A beam splitting optical system for an automatic focusing apparatus according to claim 1, wherein the splitter surface comprises a reflection surface of an optical element which constitutes an image erecting optical system provided in the optical system.

7. A beam splitting optical system for an automatic focusing apparatus according to claim 6, wherein the optical element which constitutes an image erecting optical system comprises a Porro prism.

8. The beam splitting optical system for an automatic focusing apparatus according to claim 1, said light receiving elements forming an object image in a vicinity of a reference focusing surface, said optical element being positioned between said reference focusing surface and said beam splitter.

9. The beam splitting optical system for an automatic focusing apparatus according to claim 1, said optical element having a uniform transmittance distribution.

10. A beam splitting optical system for an automatic focusing apparatus comprising:

an optical system having an objective optical system and a viewing optical system through which an object image formed on a predetermined focusing surface by the objective optical system can be viewed;

a beam splitter which splits object-carrying light transmitted through the objective optical system of said optical system via a splitter surface thereof, the splitter surface comprising a multi-layered dielectric film;

an auto-focus sensor module which detects a focus state on a reference focusing surface which is positioned to be optically equivalent to the predetermined focusing surface on the light path of the object-carrying light split by the beam splitter; said auto-focus sensor module being provided with a pair of optical sensors, said auto-focus sensor module and said beam splitter being arranged so that an object-carrying light beam to be respectively received by the pair of optical sensors is incident upon the splitter surface of the beam splitter at different incident angles;

an optical element provided between the beam splitter and the auto-focus sensor module in a light path of at least the beam having the larger quantity of object-carrying light, to be received by the optical sensors, so as to reduce the quantity of light to be transmitted therethrough.

11. A beam splitting optical system for an automatic focusing apparatus according to claim 10, wherein optical elements having different transmittances are arranged in light paths of the object-carrying light split by said beam splitter wherein the optical element having a high transmittance is disposed in the light path of the smaller quantity of light and the optical element having a low transmittance is disposed in the light path of the larger quantity of light.

12. A beam splitting optical system for an automatic focusing apparatus according to claim 10, wherein the optical element to reduce the quantity of light transmitted therethrough has a transmittance distribution which changes continuously or stepwise from a high transmittance to a low transmittance.

13. A beam splitting optical system for an automatic focusing apparatus according to claim 10, wherein said optical element that reduces the quantity of light transmitted thereto is divided into two areas, one area corresponding to each of said pair of line sensors, each of said areas having a uniform transmittance distribution.

14. A beam splitting optical system for an automatic focusing apparatus according to claim 10, wherein said optical element that reduces the quantity of light transmitted therethrough comprises a neutral density filter.

15. A beam splitting optical system for an automatic focusing apparatus according to claim 10, wherein the splitter surface is defined by a reflection surface of an optical element which constitutes an image erecting optical system provided in the optical system.

16. A beam splitting optical system for an automatic focusing apparatus according to claim 15, wherein the optical element which constitutes an image erecting optical system comprises a Porro prism.

17. The beam splitting optical system for an automatic focusing apparatus according to claim 10, said optical element being positioned between said reference focusing surface and said beam splitter.

18. The beam splitting optical system for an automatic focusing apparatus according to claim 10, said optical element having a uniform transmittance distribution.

* * * * *